(12) United States Patent
Gong et al.

(10) Patent No.: US 11,375,376 B2
(45) Date of Patent: Jun. 28, 2022

(54) METHOD, APPARATUS, DEVICE, AND MEDIUM FOR VERIFYING VEHICLE INFORMATION

(71) Applicant: Apollo Intelligent Driving Technology (Beijing) Co., Ltd., Beijing (CN)

(72) Inventors: Guohao Gong, Beijing (CN); Junping Wang, Beijing (CN); Tiankun Zhao, Beijing (CN); Dongchao Gao, Beijing (CN); Zelin Wu, Beijing (CN); Chengfa Wang, Beijing (CN); Yongyi Sun, Beijing (CN)

(73) Assignee: Apollo Intelligent Driving Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 16/917,383

(22) Filed: Jun. 30, 2020

(65) Prior Publication Data
US 2021/0099882 A1 Apr. 1, 2021

(30) Foreign Application Priority Data
Sep. 30, 2019 (CN) .......................... 201910944422.7

(51) Int. Cl.
| | |
|---|---|
| *H04W 12/106* | (2021.01) |
| *H04W 4/46* | (2018.01) |
| *H04L 67/12* | (2022.01) |
| *G05B 19/418* | (2006.01) |
| *H04W 28/04* | (2009.01) |

(52) U.S. Cl.
CPC ...... *H04W 12/106* (2021.01); *G05B 19/4185* (2013.01); *H04L 67/12* (2013.01); *H04W 4/46* (2018.02); *H04W 28/04* (2013.01)

(58) Field of Classification Search
None
See application file for complete search history.

(56) References Cited

U.S. PATENT DOCUMENTS

| | | | |
|---|---|---|---|
| 9,804,918 B1 | 10/2017 | Zhang | |
| 2011/0080302 A1* | 4/2011 | Muthaiah | ............ H04W 12/069 340/903 |
| 2017/0222753 A1* | 8/2017 | Angelopoulos | ......... H04L 67/12 |
| 2019/0204853 A1 | 7/2019 | Miller | |

FOREIGN PATENT DOCUMENTS

| | | |
|---|---|---|
| CN | 109391348 | 2/2019 |
| EP | 2326014 A2 | 5/2011 |

(Continued)

OTHER PUBLICATIONS

Author Unknown, OPC Unified Architecture, pp. 1-1698, Nov. 22, 2017.*

(Continued)

*Primary Examiner* — Christopher M Crutchfield
(74) *Attorney, Agent, or Firm* — Knobbe, Martens, Olson & Bear LLP (57) ABSTRACT

A method, apparatus, device, and medium for verifying vehicle information are provided. A specific implementation scheme is: determining a target coding precision and a target coding mode of a target data packet to be transmitted; coding the target data packet based on the target coding precision and the target coding mode, to determine target verification information of the target data packet; and transmitting the target data packet and the target verification information, to instruct a receiving-end vehicle to verify the target data packet based on the target verification information.

20 Claims, 4 Drawing Sheets

(56) References Cited

FOREIGN PATENT DOCUMENTS

| JP | 2006-157525 | 6/2006 |
| JP | 2008-042338 | 2/2008 |
| JP | 2018-121109 | 8/2018 |
| WO | WO 2019/029566 A1 | 2/2019 |

OTHER PUBLICATIONS

Author Unknown, Floating Point to Integer Mapping, pp. 1-21, Feb. 18, 2019.*
Fred Chen, Fabian Lim, Omid Abari, Anantha Chandrakasan, and Vladimir Stojanović, Energy-Aware Design of Compressed Sensing Systems for Wireless Sensors Under Performance and Reliability Constraints, pp. 1-13, Mar. 3, 2013.*
E. Baccaglini, G. Barrenetxea, B. Beferull-Lozano, Performance of Multiple Description Ciding in Sensor Networks with Finite Buffers, pp. 1-4 (Year: 2005).*
Author Unknown, Selection of Cyclic Redundancy Code and Checksum Algorithms to Ensure Critical Data Integrity, pp. 1-111, Mar. 2015.*
Guodong Xue, Lin Zhang and Yu Liu, Unequal error protection based on symmetric Slepian-Wolf coding in wireless sensor network, pp. 1-4, Sep. 26, 2009.*
Nagaosa, On a hierarchical vehicle position coding scheme in IVCN, Proceedings of the 1998 Society Conference of IEICE, The Institute of Electronics, Information and Communication Engineers 38-39 (1998).

* cited by examiner

METHOD, APPARATUS, DEVICE, AND MEDIUM FOR VERIFYING VEHICLE INFORMATION

CROSS-REFERENCE TO RELATED APPLICATIONS

This application claims priority to Chinese Patent Application No. 201910944422.7, filed with the China National Intellectual Property Administration (CNIPA) on Sep. 30, 2019, the contents of which are incorporated herein by reference in their entirety.

TECHNICAL FIELD

Embodiments of the present disclosure relate to the field of computer technology, specifically to the field of autonomous driving technology, and more specifically to a method, apparatus, device, and medium for verifying vehicle information.

BACKGROUND

With the rapid development of smart networking technology, V2V (vehicle-to-vehicle) communication technology is gradually integrated into autonomous vehicles to realize wireless information interaction between vehicle terminals.

Because transmission errors (such as omissions or alterations) and on-board OBU (On Board Unit) analysis errors may occur during the transmission of V2V messages, it is difficult for the autonomous vehicles to effectively validate the obtained V2V messages based on the data precision, thereby reducing the driving security of the autonomous vehicles.

SUMMARY

Embodiments of the present disclosure provide a method, apparatus, device, and medium for verifying vehicle information, which can effectively validate V2V messages, and improve the driving security of autonomous vehicles.

According to a first aspect, some embodiments of the present disclosure provide a method for verifying vehicle information, including:

determining a target coding precision and a target coding mode of a target data packet to be transmitted;

coding the target data packet based on the target coding precision and the target coding mode, to determine target verification information of the target data packet; and transmitting the target data packet and the target verification information, to instruct a receiving-end vehicle to verify the target data packet based on the target verification information.

Embodiments in the above disclosure have the following advantages and beneficial effects: by limiting the coding mode of the data precision during coding, and determining local key data items based on data of limited precision, to obtain the target verification information of the local key data items, thereby the impact of uncertain values which are beyond the precision range on the correctness of the information during data transmission and analysis is avoided, guaranteeing the validity of the verify, and then ensuring the autonomous driving security.

Alternatively, the determining a target coding precision and a target coding mode of a target data packet to be transmitted includes:

selecting target key information from the target data packet based on preset key information;

determining a target message type of the target key information; and determining the target coding precision and the target coding mode of the target data packet based on the target message type.

Embodiments in the above disclosure have the following advantages or beneficial effects: for different message types, corresponding target coding precisions and target coding modes may be used for coding, such that the employed coding rule are more in line with the characteristics and attributes of data themselves, thereby improving the precision of the information verification.

Alternative, the coding the target data packet based on the target coding precision and the target coding mode, to determine target verification information of the target data packet including:

extracting, from the target key information of the target data packet, to-be-coded data within a range of the target coding precision based on the target coding precision; and coding the to-be-coded data using the target coding mode, to generate the target verification information.

Embodiments in the above disclosure have the following advantages or beneficial effects: based on the target coding precision, the local key data items are coded according to the target coding mode, thereby avoiding the impact of uncertain values which are beyond the precision range on the correctness of the information during data transmission and analysis, guaranteeing the validity of the verify, and then ensuring the autonomous driving security.

Alternatively, the method further includes:

receiving the target data packet transmitted by a sending-end vehicle and the target verification information of the target data packet;

determining the target coding precision and the target coding mode of the target data packet;

coding the target data packet based on the target coding precision and the target coding mode, to determine to-be-verified information of the target data packet; and verifying the target data packet based on the target verification information and the to-be-verified information.

Embodiments in the above disclosure have the following advantages or beneficial effects: the receiving-end vehicle can code the received target data packet based on the determined target coding precision and target coding mode based on a given determining approach, thereby verifying the target data packet based on the received target verification information and to-be-verified information which is determined by recoding, and improving the precision of the receiving-end vehicle on the information verification Alternatively, the determining the target coding precision and the target coding mode of the target data packet includes:

reading the target data packet, to determine the target key information with a key information identifier;

determining, based on the key information identifier, the target message type of the target key information; and determining, based on the target message type, the target coding precision and the target coding mode.

Embodiments in the above disclosure have the following advantages or beneficial effects: for different message types, corresponding target coding precisions and target coding modes may be used for coding, such that the employed coding rule are more in line with the characteristics and attributes of data themselves, thereby improving the precision of the information verification.

Alternatively, the coding the target data packet based on the target coding precision and the target coding mode, to determine to-be-verified information of the target data packet includes:

extracting, from the target key information of the target data packet, to-be-verified data within the range of the target coding precision based on the target coding precision; and coding the to-be-verified data using the target coding mode, to generate the to-be-verified information.

Embodiment in the above disclosure have the following advantages or beneficial effects: based on the target coding precision, the local key data items are coded according to the target coding mode, thereby avoiding the impact of uncertain values which are beyond the precision range on the correctness of the information during data transmission and analysis, guaranteeing the validity of the verify, and then ensuring the autonomous driving security.

Alternatively, the verifying the target data packet based on the target verification information and the to-be-verified information includes:

comparing the to-be-verified information with the target verification information;

determining the target data packet being correct, in response to the to-be-verified information being identical to the target verification information; and determining the target data packet being incorrect, in response to the to-be-verified information being different from the target verification information.

Embodiments in the above disclosure have the following advantages or beneficial effects: after coding based on the local key data items, the information verification is successful, in response to the to-be-verified information being identical to the target verification information. Even if data beyond the coding precision are different, the information verification result will not be affected, thereby improving the precision and fault tolerance of the information verification.

According to a second aspect, some embodiments of the present disclosure provide an apparatus for verifying vehicle information, including:

a coding rule determining module configured to determine a target coding precision and a target coding mode of a target data packet to be transmitted;

a coding module configured to code the target data packet based on the target coding precision and the target coding mode, to determine target verification information of the target data packet;

a verification information transmitting module configured to transmit the target data packet and the target verification information, and instruct a receiving-end vehicle to verify the target data packet based on the target verification information.

According to a third aspect, some embodiments of the present disclosure provides an electronic device, including:

at least one processor; and a memory in communication connection with the at least one processor; where the memory stores instructions that can be executed by the at least one processor, and the instructions are executed by the at least one processor, such that the at least one processor can execute a method for verifying vehicle information according to any one of the embodiments of the present disclosure.

According to a fourth aspect, some embodiments provide a non-transitory computer readable storage medium storing a computer instruction, wherein the computer instruction is used for causing a computer to execute a method for verifying vehicle information according to any one of the embodiments of the present disclosure.

Embodiments in the above disclosure have the following advantages and beneficial effects: determining a target coding precision and a target coding mode of a target data packet to be transmitted, and coding the target data packet based on the target coding precision and the target coding mode, to determine target verification information of the target data packet, thereby transmitting the target verification information and the target data packet together, to instruct a receiving-end vehicle to verify the target data packet. This embodiment limits the coding mode of the data precision during coding, and determines local key data items based on data of limited precision, to obtain the target verification information of the local key data items, thereby avoiding the impact of uncertain values which are beyond the precision range on the correctness of the information during data transmission and analysis, guaranteeing the validity of the verify, and then ensuring the autonomous driving security.

Other effects of the above alternative implementations will be described below with reference to the specific embodiments.

BRIEF DESCRIPTION OF THE DRAWINGS

The accompanying drawings are used for better understanding of the present solution, and do not constitute a limitation to the present disclosure. In the drawings.

DETAILED DESCRIPTION OF EMBODIMENTS

The example embodiments of the present disclosure are described below with reference to the accompanying drawings, which include various details of embodiments of the present disclosure to facilitate understanding, and should be considered merely as examples. Therefore, those of ordinary skills in the art should realize that various alterations and modifications can be made to the embodiments described herein without departing from the scope and spirit of the present disclosure. Similarly, for clarity and conciseness, descriptions of well-known functions and structures are omitted in the following description.

First Embodiment

Figure 1:
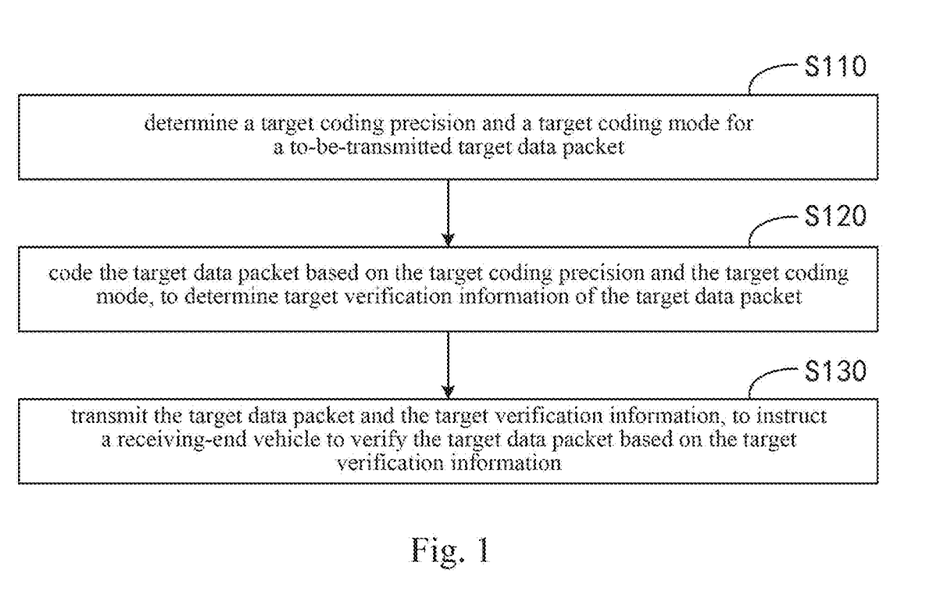
FIG. 1 is a flowchart of a method for verifying vehicle information according to a first embodiment of the present disclosure.

FIG. 1 is a flowchart of a method for verifying vehicle information according to a first embodiment of the present disclosure. The present embodiment may be adapted to the situation of verifying information transmitted between autonomous vehicles. This method may be executed by an apparatus for verifying vehicle information. Said apparatus is implemented by software and/or hardware, and is preferably configured in a to-be-configured electronic device. As shown in FIG. 1, the method specifically includes the following steps:

S110: determining a target coding precision and a target coding mode of a target data packet to be transmitted.

In a specific embodiment of the present disclosure, information interaction between autonomous vehicles may be performed, such that an autonomous vehicle can generate a driving strategy for automatic driving based on received information sent from other vehicles, thereby avoiding occurrence of accidents, such as a collision, between vehicles. The target data packet refers to information to be transmitted between vehicles. For a sending-end vehicle, the target data packet is information to be sent by the sending-end vehicle; and for a receiving-end vehicle, the target data packet is information received by the receiving-end vehicle. Information transmission between the sending-end vehicle and the receiving-end vehicle may be performed through broadcasting or peer-to-peer communication. The data packet may include information, such as any vehicle-related parameter or environment, and may further include identifier information of the sending-end vehicle and identifier information of the receiving-end vehicle.

In the present embodiment, the target coding precision is used for limiting the precision of the data used in coding. For example, the target coding precision may be preset as four decimal figures, i.e., indicating only using data within a range of the target coding precision for coding. The target coding mode is used for stipulating a coding algorithm used in coding, such as cyclic redundancy check (CRC).

In the present embodiment, key information used for coding and generating verification information may be preset in the target data packet. Then, when the sending-end vehicle sends the target data packet, target key information may be selected from the target data packet based on the preset key information, and a key information identifier may be added to the target key information, for reading by the receiving-end vehicle. For example, speed information is pre-defined as the key information, and then a key information identifier is added for the speed information in the target data packet.

In the present embodiment, a coding priority of each type of message may also be preset. Then, one or more messages with a highest priority are found from the target data packet for use as the target key information, and then a key information identifier is added thereto. For example, assuming that priorities of types of message are preset as, successively in descending order, distance information, speed information, and illumination intensity information, and the target data packet includes the speed information and the illumination intensity information, then a key information identifier is added to the speed information in the target data packet.

In the present embodiment, an association relationship between the message type, the coding precision, and the coding mode may be preset, thereby the target coding precision and the target coding mode of the target data packet are determined based on the determined message type of the target key information.

S120: coding the target data packet based on the target coding precision and the target coding mode, to determine target verification information of the target data packet.

In a specific embodiment of the present disclosure, the target verification information is generated and transmitted by the sending-end vehicle, such that the receiving-end vehicle validates the target data packet based on the target verification information, to provide the receiving-end vehicle with the basis for information verification.

In the present embodiment, during generating the target verification information, the sending-end vehicle can extract, from the target key information of the target data packet, the data within the range of the target coding precision based on the target coding precision, for use as to-be-coded data, and then code the to-be-coded data using the target coding mode, to generate the target verification information.

As an example, assuming that the association relationship between the message type, the coding precision and the coding mode is pre-established as: speed information, four decimal figures, and CRC. Then for vehicle speed information in the target data packet, e.g., 5.345678, the to-be-coded data within the range of the target precision are extracted as 5.3456, and 5.3456 is substituted into the CRC coding equation to obtain the target verification information of the target data packet.

S130: transmitting the target data packet and the target verification information, to instruct a receiving-end vehicle to verify the target data packet based on the target verification information.

In a specific embodiment of the present disclosure, the sending-end vehicle sends the target verification information and the target data packet together. Accordingly, after receiving the target data packet and the target verification information, the receiving-end vehicle performs information verification on the target data packet, to ensure that the received target data packet is accurate or falls within a fault tolerant range.

In the present embodiment, the receiving-end vehicle determines the target key information with a key information identifier by reading the target data packet, and determines the target coding precision and the target coding mode based on a target message type of the target key information, thereby coding the target data packet based on the target coding precision and the target coding mode, and generating to-be-verified information obtained by the receiving-end vehicle through recomputation. Further, the receiving-end vehicle compares the received target verification information with the to-be-verified information computed by itself, to verify the target data packet.

As an example, in the above example, because there may be errors in transmission or analysis, assuming that, in the target data packet obtained by the receiving-end vehicle through analysis, the speed information is 5.345688. Based on the association relationship between the speed information, the four decimal figures, and the CRC, 5.3456 is coded to generate the to-be-verified information. Based on that the coding precision and the coding mode is determined, original speed data coded by both the sending-end vehicle and the receiving-end vehicle is 5.3456. Therefore, the target verification information is identical to the to-be-verified information, and the received target data packet is verified to be correct, thereby avoiding coding the 5.345688 which is incorrectly transmitted or analyzed to obtain incorrect verification information, which leads to verification failure, therefore ensuring the validity of the verify.

The technical solutions of the present embodiment determine a target coding precision and a target coding mode of a target data packet to be transmitted, and code the target data packet based on the target coding precision and the target coding mode, to determine target verification information of the target data packet, thereby transmitting the target verification information and the target data packet together, to instruct a receiving-end vehicle to verify the target data packet. The technical solutions limit the coding mode of the data precision during coding, and determine local key data items based on the data of limited precision, to obtain the target verification information of the local key data items, thereby avoiding the impact of the uncertain values which are beyond the precision range on the correctness of the information in the process of data transmission and analysis, guaranteeing the validity of the verification, and then ensuring the autonomous driving security.

Second Embodiment

Figure 2:
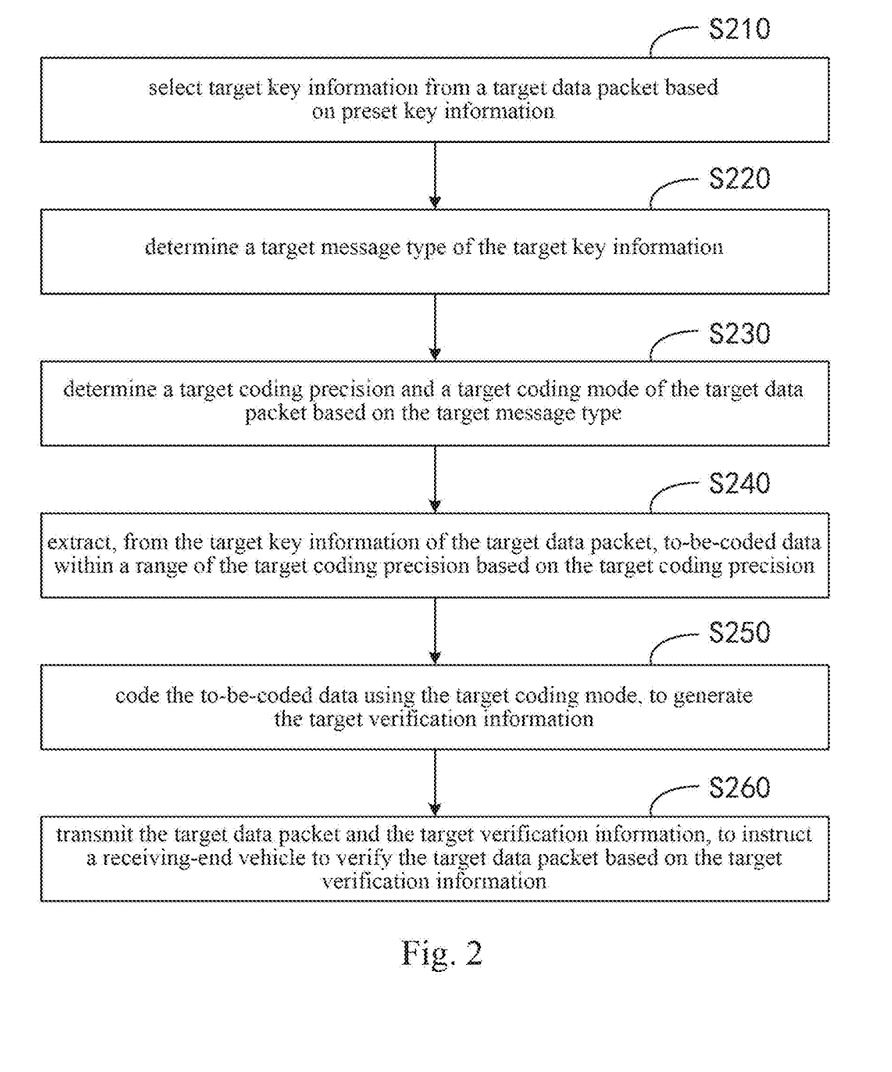
FIG. 2 is a flowchart of a method for verifying vehicle information according to a second embodiment of the present disclosure.

FIG. 2 is a flowchart of a method for verifying vehicle information according to a second embodiment of the present disclosure. Based on the first embodiment, the present embodiment further explains the approach of generating target verification information by a sending-end vehicle, and can generate, when a vehicle is the sending-end vehicle, the target verification information for the target data packet based on a target coding precision and a target coding mode. As shown in FIG. 2, the method specifically includes the following steps:

S210: selecting, based on preset key information, target key information from a target data packet.

In a specific embodiment of the present disclosure, key information used for coding and generating verification information may be preset in the target data packet. Then, when sending the target data packet, the sending-end vehicle may select the target key information from the target data packet based on the preset key information, and add a key information identifier to the target key information, to facilitate reading by the receiving-end vehicle. For example, speed information is pre-defined for use as the key information, then the speed information is selected from the target data packet for use as the target key information, and a key information identifier is added thereto.

In the present embodiment, a coding priority of each type of message may also be preset. Then, one or more messages with a highest priority are found from the target data packet for use as the target key information, and a key information identifier is added thereto. For example, assuming that priorities of types of message are preset as, successively in descending order, distance information, speed information, and illumination intensity information, and the target data packet includes the speed information and the illumination intensity information, then the speed information is selected from the target data packet for use as the target key information, and a key information identifier is added.

S220: determining a target message type of the target key information.

In a specific embodiment of the present disclosure, a message type may refer to an attribute of a data content described in a message, such as a speed, or a distance. The message type may also be a data representation form, such as an integer, or a float. The message type is not limited in the present embodiment, and any message classification method capable of assisting in information validation can be applied in the present embodiment.

S230: determining, based on the target message type, a target coding precision and a target coding mode of the target data packet.

In a specific embodiment of the present disclosure, an association relationship between the message type, the coding precision, and the coding mode may be preset, thereby the target coding precision and the target coding mode of the target data packet are determined based on the determined message type of the target key information.

S240: extracting, from the target key information of the target data packet, to-be-coded data within a range of the target coding precision based on the target coding precision.

In a specific embodiment of the present disclosure, due to the collection of vehicle-side data, the limitation of the communication protocol, etc., the data representation form of the target key information may include a large number of digits. For one or more digits at the end of a value, it is inevitable that estimated values are generated by analysis or digits stuffing. Therefore, the present embodiment does not code the whole data packet or complete target key information, but extracts, from the target key information of the target data packet, local data within the range of the target coding precision for use as the to-be-coded data, for coding and generating the target verification information.

S250: coding the to-be-coded data using the target coding mode, to generate the target verification information.

S260: transmitting the target data packet and the target verification information, to instruct a receiving-end vehicle to verify the target data packet based on the target verification information.

The technical solutions of the present embodiment select target key information from a target data packet, and determine a target coding precision and a target coding mode of the target data packet based on a message type of the target key information, thereby extract, from the target key information of the target data packet, to-be-coded data within a range of the target coding precision according to the target coding precision, code the to-be-coded data using the target coding mode, generate the target verification information, and transmit the target verification information and the target data packet together, to instruct a receiving-end vehicle to verify the target data packet. The technical solutions limit the coding mode of the data precision during coding, and determine local key data items based on the data of limited precision, to obtain the target verification information of the local key data items, thereby avoiding the impact of uncertain values which are beyond the precision range on the correctness of the information in the process of data transmission and analysis, guaranteeing the validity of the verify, and then ensuring the autonomous driving security.

Third Embodiment

Figure 3:
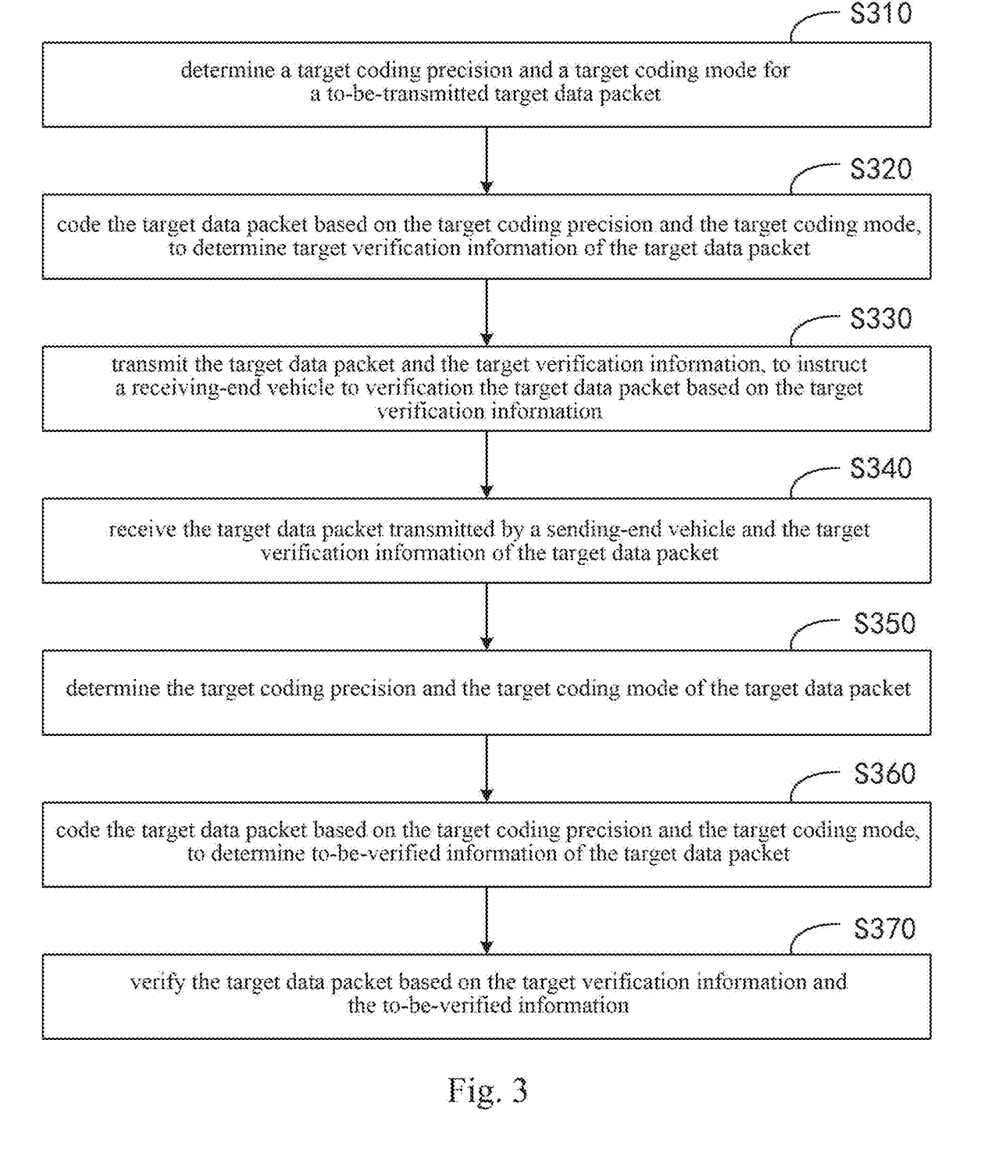
FIG. 3 is a flowchart of a method for verifying vehicle information according to a third embodiment of the present disclosure.

FIG. 3 is a flowchart of a method for verifying vehicle information according to a third embodiment of the present disclosure. Based on the first embodiment, the present embodiment further explains an approach of verifying a target data packet by a receiving-end vehicle, and when a vehicle is the receiving-end vehicle, the vehicle can generate to-be-verified information using a coding mode identical to a coding mode used by a sending-end vehicle, for verifying the target data packet. As shown in FIG. 3, the method specifically includes the following steps:

S310: determining a target coding precision and a target coding mode of a target data packet to be transmitted.

S320: coding the target data packet based on the target coding precision and the target coding mode, to determine target verification information of the target data packet.

S330: transmitting the target data packet and the target verification information, to instruct a receiving-end vehicle to verify the target data packet based on the target verification information.

S340: receiving the target data packet transmitted by a sending-end vehicle and the target verification information of the target data packet.

In a specific embodiment of the present disclosure, in view of the fact that, when sending the target data packet, the sending-end vehicle sends the target verification information and the target data packet together, accordingly, the receiving-end vehicle can receive the target data packet and the target verification information together.

S350: determining the target coding precision and the target coding mode of the target data packet.

In a specific embodiment of the present disclosure, target key information may be determined from the target data packet based on preset key information or a priority of each type of key information, such that the receiving-end vehicle can recompute to obtain the to-be-verified information using a coding rule identical to the coding rule used by the sending-end vehicle. Or, alternatively, the target data packet is read to determine the target key information with a key information identifier, thereby determining a target message type of the target key information based on the key information identifier, and determining the target coding precision and the target coding mode based on the target message type.

S360: coding the target data packet based on the target coding precision and the target coding mode, to determine to-be-verified information of the target data packet.

In a specific embodiment of the present disclosure, a coding mode identical to the coding mode used by the sending-end vehicle may be used. Alternatively, to-be-verified data within the range of the target coding precision are extracted from the target key information of the target data packet according to the target coding precision; and the to-be-verified data are coded using the target coding mode, to generate the to-be-verified information.

S370: verifying the target data packet based on the target verification information and the to-be-verified information.

In a specific embodiment of the present disclosure, the target verification information is generated by the sending-end vehicle, and the to-be-verified information is generated by the receiving-end vehicle. Therefore, in order to validate whether there is an error during the message transmission and analysis, the to-be-verified information may be compared with the target verification information. The target data packet being correct is determined in response to the to-be-verified information being identical to the target verification information. The target data packet being incorrect is determined in response to the to-be-verified information being different from the target verification information.

The technical solutions of the present embodiment can determine, after a vehicle receives a target data packet and verification information of the target data packet, a target coding precision and a target coding mode of the target data packet using an approach identical to the approach used by the sending-end vehicle, and code the target data packet based on the target coding precision and the target coding mode to determine to-be-verified information of the target data packet, thereby comparing the to-be-verified information and the target verification information, and determine the target data packet being correct in response to the to-be-verified information being identical to the target verification information. The technical solutions limit the coding mode of the data precision during coding, and determine local key data items based on data of limited precision, to obtain the target verification information of the local key data items, thereby avoiding the impact of uncertain values which are beyond the precision range on the correctness of the information during data transmission and analysis, guaranteeing the validity of the verify, and then ensuring the autonomous driving security.

Fourth Embodiment

Figure 4:
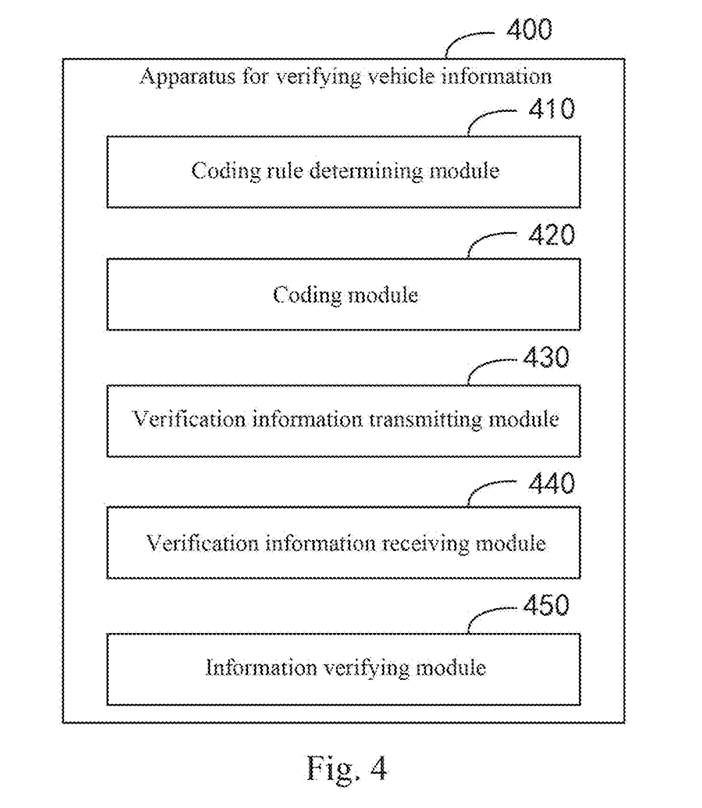
FIG. 4 is a schematic structural diagram of an apparatus for verifying vehicle information according to a fourth embodiment of the present disclosure.

FIG. 4 is a schematic structural diagram of an apparatus 400 for verifying vehicle information according to a fourth embodiment of the present disclosure. The present embodiment may be adapted to verify the information transmitted between autonomous vehicles. This apparatus can implement a method for verifying vehicle information according to an embodiment of the present disclosure. The apparatus 400 can include one or more of the following:

a coding rule determining module 410, configured to determine a target coding precision and a target coding mode of a target data packet to be transmitted.

a coding module 420, configured to code the target data packet based on the target coding precision and the target coding mode, to determine target verification information of the target data packet.

a verification information transmitting module 430, configured to transmit the target data packet and the target verification information, to instruct a receiving-end vehicle to verify the target data packet based on the target verification information.

Alternatively, the coding rule determining module 410 is specifically configured to:

select target key information from the target data packet based on preset key information;

determine a target message type of the target key information;

determine the target coding precision and the target coding mode of the target data packet based on the target message type.

Alternatively, the coding module is specifically configured to:

extract, from the target key information of the target data packet, to-be-coded data within a range of the target coding precision based on the target coding precision; and code the to-be-coded data using the target coding mode, to generate the target verification information.

Furthermore, the apparatus 400 can include:

a verification information receiving module 440, configured to receive the target data packet transmitted by a sending-end vehicle and the target verification information of the target data packet;

a coding rule determining module 410, configured to determine the target coding precision and the target coding mode of the target data packet;

the coding module 420, configured to coding the target data packet based on the target coding precision and the target coding mode, to determine to-be-verified information of the target data packet;

an information verification module 450, configured to verify the target data packet based on the target verification information and the to-be-verified information.

Alternatively, the coding rule determining module 410 is further configured to:

read the target data packet, to determine the target key information with a key information identifier;

determine, based on the key information identifier, the target message type of the target key information; and determine, based on the target message type, the target coding precision and the target coding mode.

Alternatively, the coding module is specifically configured to:

extracting, from the target key information of the target data packet, to-be-verified data within the range of the target coding precision based on the target coding precision; and code the to-be-verified data using the target coding mode, to generate the to-be-verified information.

alternatively, the information verification module 450 is specifically configured:

compare the to-be-verified information with the target verification information;

determine the target data packet being correct, in response to the to-be-verified information being identical to the target verification information;

determine the target data packet being incorrect, in response to the to-be-verified information being different from the target verification information.

The technical solutions of the present embodiment implement functions, such as determining a coding rule, determining to-be-coded data, generating and sending target verification information, and generating and validating to-be-verified information, through mutual cooperation between functional modules. The technical solutions limit the coding mode of the data precision during coding, and determine local key data items based on data of limited precision, to obtain the target verification information of the local key data items, thereby avoiding the impact of uncertain values which are beyond the precision range on the correctness of the information during data transmission and analysis, guaranteeing the validity of the verify, and then ensuring the autonomous driving security.

Fifth Embodiment

According to some embodiments of the present disclosure, an electronic device and a readable storage medium provided.

Figure 5:
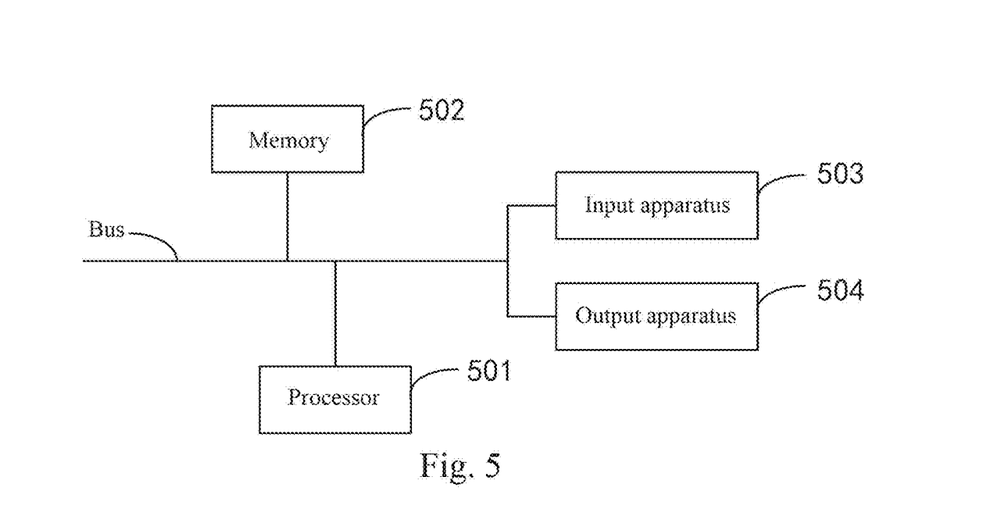
FIG. 5 is a block diagram of an electronic device for implementing a method for verifying vehicle information of embodiments of the present disclosure.

As shown in FIG. 5, a block diagram of an electronic device for implementing a method for verifying vehicle information of embodiments of the present disclosure is shown. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cell phone, a smart phone, a wearable device, and other similar computing apparatuses. The components shown herein, the connections and relationships thereof, and the functions thereof are meant to be examples only, and are not intended to limit implementations of the present disclosure described and/or claimed herein.

As shown in FIG. 5, the electronic device includes: one or more processors 501, a memory 502, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or an external input/output apparatus on the memory, e.g., a display device coupled to an interface, graphical information of a graphical user interface (GUI) is displayed thereon. In other embodiments, a plurality of processors and/or a plurality of buses may be used, if necessary, along with a plurality of memories. Also, a plurality of electronic devices may be connected, with each device providing portions of the necessary operations, e.g., as a server array, a group of blade servers, or a multi-processor system. FIG. 5 takes a processor 501 as an example.

The memory 502 is a non-transitory computer readable storage medium provided by some embodiments of the present disclosure. The memory stores instructions executable by at least one processor, such that the at least one processor executes the method for verifying vehicle information. The non-transitory computer readable storage medium of the present disclosure stores computer instructions. The computer instructions are used for causing a computer to execute the method for verifying vehicle information.

As a non-transitory computer readable storage medium, the memory 502 may be configured to store non-transitory software programs, non-transitory computer executable programs and modules, such as the program instructions/modules (e.g., a coding rule determining module 410, a coding module 420, a verification information transmitting module 430, a verification information receiving module 440, and an information verifying module 450 shown in FIG. 4) corresponding to the method for verifying vehicle information in some embodiments of the present disclosure. The processor 501 runs non-transitory software programs, instructions, and modules stored in the memory 502, so as to execute various function applications and data processing of a server, i.e., implementing the method for verifying vehicle information in the above embodiments of the method.

The memory 502 may include a program storage area and a data storage area, where the program storage area may store an operating system and application programs required by at least one function; and the data storage area may store, e.g., data created based on use of the electronic device of the method for verifying vehicle information. In addition, the memory 502 may include a high-speed random access memory, and may further include a non-transitory memory, such as at least one magnetic disk storage component, a flash memory component, or other non-transitory solid-state storage components. In some embodiments, the memory 502 may alternatively include memories disposed remotely relative to the processor 501, and these remote memories may be connected to the electronic device of the method for verifying vehicle information via a network. Examples of the above network include, but are not limited to, the Internet, an intranet, a local area network, a mobile communication network, and a combination thereof.

The electronic device of the method for verifying vehicle information may further include: an input apparatus 503 and an output apparatus 504. The processor 501, the memory 502, the input apparatus 503, and the output apparatus 504 may be connected through a bus or in other manners. Bus connection is taken as an example in FIG. 5.

The input apparatus 503 can receive inputted digital or character information, and generate key signal input related to user settings and function control of the electronic device of the method for verifying vehicle information, e.g., an input apparatus such as a touch screen, a keypad, a mouse, a trackpad, a touchpad, an indicating arm, one or more mouse buttons, a trackball, and a joystick. The output apparatus 504 may include a display device, an auxiliary lighting apparatus (e.g., a light emitting diode (LED)), a haptic feedback apparatus (e.g., a vibration motor), and the like. The display device may include, but is not limited to, a liquid crystal display (LCD), a LED display, and a plasma display. In some embodiments, the display device may be a touch screen.

Various embodiments of the systems and technologies described herein may be implemented in a digital electronic circuit system, an integrated circuit system, an application specific integrated circuit (ASIC), computer hardware, firmware, software, and/or a combination thereof. The various implementations may include: implementation in one or more computer programs, the one or more computer programs may be executable and/or interpretable on a programmable system including at least one programmable processor, the programmable processor may be special purpose or general purpose programmable processor, may receive data and instructions from, and to transmit data and instructions to, a storage system, at least one input apparatus, and at least one output apparatus.

These computer programs (also known as programs, software, software applications, or code) include machine instructions for a programmable processor, and may be implemented in a high-level procedural and/or object-oriented programming language, and/or in assembly/machine language. As used herein, the terms "machine readable medium" and "computer readable medium" refer to any computer program product, device, and/or apparatus (e.g., a magnetic disk, an optical disk, a memory, or a programmable logic device (PLD)) used to provide machine instructions and/or data to a programmable processor, and include a machine readable medium receiving machine instructions as machine readable signals. The term "machine readable signal" refers to any signal used to provide machine instructions and/or data to a programmable processor.

To provide interaction with a user, the systems and technologies described herein can be implemented on a computer that has: a display apparatus, e.g., a cathode ray tube (CRT) or a LCD monitor, for displaying information to the user; and a keyboard and a pointing apparatus, e.g., a mouse or a trackball, through which the user can provide input to the computer. Other kinds of apparatus may also be used to provide interaction with the user. For example, the feedback provided to the user may be any form of sensory feedback, e.g., visual feedback, auditory feedback, or haptic feedback; and input from the user may be received in any form, including acoustic input, voice input, or tactile input.

The systems and technologies described herein may be implemented in a computing system that includes a back-end component, e.g., a data server, or a computing system that includes a middleware component, e.g., an application server, or a computing system that includes a front-end component, e.g., a user computer with a graphical user interface or a web browser through which the user can interact with an implementation of the systems and technologies described herein, or any combination of such back-end component, middleware component, or front-end component. The components of the system can be interconnected by any form or medium of digital data communication, e.g., a communication network. Examples of the communication network include: a local area network (LAN), a wide area network (WAN), and the Internet.

The computer system may include clients and servers. A client and a server are generally remote from each other and typically interact through a communication network. The relationship of client and server arises by virtue of computer programs running on corresponding computers and having a client-server relationship to each other.

The technical solutions of some embodiments of the present disclosure limit the coding mode of the data precision during coding, and determine local key data items based on data of limited precision, to obtain the target verification information of the local key data items, thereby avoiding the impact of uncertain values which are beyond the precision range on the correctness of the information verification during data transmission and analysis, guaranteeing the validity of the verify, and then ensuring the autonomous driving security.

In addition, an embodiment in the above disclosure has the following advantages or beneficial effects: for different message types, corresponding target coding precisions and target coding modes may be used for coding, such that the employed coding rule are more in line with the characteristics and attributes of data themselves, thereby improving the precision of the information verification.

In addition, an embodiment in the above disclosure has the following advantages or beneficial effects: the receiving-end vehicle can code the received target data packet based on the determined target coding precision and target coding mode based on a given determining approach, thereby verifying the target data packet based on the received target verification information and to-be-verified information which is determined by recoding, and improving the precision of the receiving-end vehicle on the information verification.

In addition, an embodiment in the above disclosure has the following advantages or beneficial effects: after coding based on the local key data items, the information verification is successful, in response to the to-be-verified information being identical to the target verification information. Even if data beyond the coding precision are different, the information verification result will not be affected, thereby improving the precision and fault tolerance of the information verification.

It should be understood that the various forms of processes shown above can be used to reorder, add, or delete steps. For example, the steps described in the present disclosure can be executed in parallel, sequentially, or in different orders, as long as the desired results of the technical solutions disclosed in the present disclosure can be achieved. This is not limited herein.

The above specific embodiments do not constitute a limitation to the protection scope of the present disclosure. It should be understood by those skilled in the art that various modifications, combinations, sub-combinations, and substitutions may be made according to the design requirements and other factors. Any modification, equivalent replacement, improvement, and the like made within the spirit and principle of the present disclosure should be included within the protection scope of the present disclosure.

What is claimed is:

1. A method for verifying vehicle information, comprising:
   ranking a plurality of pieces of information included in a target data packet based on a preset ranking order of pieces of information;
   selecting a target piece of information from the plurality of pieces of information as the target key information based on the ranked pieces of information;
   determining a target coding precision and a target coding mode for the target data packet to be transmitted;
   coding the target data packet based on the target coding precision and the target coding mode, to determine target verification information of the target data packet, wherein coding the target data packet based on the target coding precision and the target coding mode comprises: coding the target key information based on the target coding precision and the target coding mode; and
   transmitting the target data packet and the target verification information, to instruct a receiving-end vehicle receiving the target data packet to verify received target data packet based on the target verification information.

2. The method according to claim 1, wherein the determining a target coding precision and a target coding mode for a target data packet to be transmitted comprises:
   determining a target message type of the target key information; and
   determining the target coding precision and the target coding mode of the target data packet based on the target message type.

3. The method according to claim 1, wherein the coding the target key information based on the target coding precision and the target coding mode comprises:
   extracting, from the target key information of the target data packet, to-be-coded data within a range of the target coding precision based on the target coding precision; and
   coding the to-be-coded data using the target coding mode, to generate the target verification information.

4. The method according to claim 1, wherein the method further comprises:
   receiving the target data packet transmitted by a sending-end vehicle and the target verification information of the target data packet;
   determining the target coding precision and the target coding mode of the received target data packet;
   coding the received target data packet based on the target coding precision and the target coding mode, to determine to-be-verified information of the received target data packet; and
   verifying the received target data packet based on the target verification information and the to-be-verified information.

5. The method according to claim 4, wherein the determining the target coding precision and the target coding mode of the received target data packet comprises:
   reading the received target data packet, to determine the target key information with a key information identifier;
   determining, based on the key information identifier, the target message type of the target key information; and
   determining, based on the target message type, the target coding precision and the target coding mode.

6. The method according to claim 4, wherein the coding the received target data packet based on the target coding precision and the target coding mode, to determine to-be-verified information of the received target data packet comprises:
   extracting, from the target key information of the received target data packet, to-be-verified data within the range of the target coding precision based on the target coding precision; and
   coding the to-be-verified data using the target coding mode, to generate the to-be-verified information.

7. The method according to claim 4, wherein the verifying the received target data packet based on the target verification information and the to-be-verified information comprises:
   comparing the to-be-verified information with the target verification information;
   determining the received target data packet being correct, in response to the to-be-verified information being identical to the target verification information; and
   determining the received target data packet being incorrect, in response to the to-be-verified information being different from the target verification information.

8. The method according to claim 1, wherein the preset ranking order of pieces of information comprises a ranking order of a distance, a speed, and an illuminance intensity.

9. The method according to claim 1, wherein selecting a piece of information from the plurality of pieces of information as the target key information based on the ranked pieces of information comprises: selecting a top ranked piece of information among the plurality of pieces of information as the target key information.

10. An apparatus for verifying vehicle information, comprising:
    at least one processor; and
    a memory storing instructions, the instructions when executed by the at least one processor, causing the at least one processor to perform operations, the operations comprising:
    ranking a plurality of pieces of information included in a target data packet based on a preset ranking order of pieces of information;
    selecting a target piece of information from the plurality of pieces of information as the target key information based on the ranked pieces of information;
    determining a target coding precision and a target coding mode for theft target data packet to be transmitted;
    coding the target data packet based on the target coding precision and the target coding mode, to determine target verification information of the target data packet, wherein coding the target data packet based on the target coding precision and the target coding mode comprises: coding the target key information based on the target coding precision and the target coding mode; and
    transmitting the target data packet and the target verification information, and instruct a receiving-end vehicle receiving the target data packet to verify received target data packet based on the target verification information.

11. The apparatus according to claim 10, wherein the determining a target coding precision and a target coding mode for a target data packet to be transmitted comprises:
    determining a target message type of the target key information; and
    determining the target coding precision and the target coding mode of the target data packet based on the target message type.

12. The apparatus according to claim 10, wherein the coding the target key information based on the target coding precision and the target coding mode comprises:
    extracting, from the target key information of the target data packet, to-be-coded data within a range of the target coding precision based on the target coding precision; and
    coding the to-be-coded data using the target coding mode, to generate the target verification information.

13. The apparatus according to claim 10, wherein the operations further comprise:
    determining the target coding precision and the target coding mode of the received target data packet;
    coding the received target data packet based on the target coding precision and the target coding mode, to determine to-be-verified information of the received target data packet; and
    verifying the received target data packet based on the target verification information and the to-be-verified information.

14. The apparatus according to claim 13, wherein the determining the target coding precision and the target coding mode of the received target data packet comprises:

reading the received target data packet, to determine the target key information with a key information identifier;

determining, based on the key information identifier, the target message type of the target key information; and determining, based on the target message type, the target coding precision and the target coding mode.

15. The apparatus according to claim 13, wherein the coding the received target data packet based on the target coding precision and the target coding mode, to determine to-be-verified information of the received target data packet comprises:

extracting, from the target key information of the received target data packet, to-be-verified data within the range of the target coding precision based on the target coding precision; and coding the to-be-verified data using the target coding mode, to generate the to-be-verified information.

16. The apparatus according to claim 13, wherein the verifying the received target data packet based on the target verification information and the to-be-verified information comprises:

comparing the to-be-verified information with the target verification information;

determining the received target data packet being correct, in response to the to-be-verified information being identical to the target verification information; and determining the received target data packet being incorrect, in response to the to-be-verified information being different from the target verification information.

17. A non-transitory computer readable storage medium storing a computer instruction, wherein the computer instruction, when executed by a processor, causes the processor to perform operations, the operations comprising:

ranking a plurality of pieces of information included in a target data packet based on a preset ranking order of pieces of information;

selecting a target piece of information from the plurality of pieces of information as the target key information based on the ranked pieces of information;

determining a target coding precision and a target coding mode for the target data packet to be transmitted;

coding the target data packet based on the target coding precision and the target coding mode, to determine target verification information of the target data packet, wherein coding the target data packet based on the target coding precision and the target coding mode comprises: coding the target key information based on the target coding precision and the target coding mode; and transmitting the target data packet and the target verification information, to instruct the receiving-end vehicle receiving the target data packet to verify received target data packet based on the target verification information.

18. The medium according to claim 17, wherein the determining a target coding precision and a target coding mode for a target data packet to be transmitted comprises:

determining a target message type of the target key information; and determining the target coding precision and the target coding mode of the target data packet based on the target message type.

19. The medium according to claim 17, wherein the coding the target key information based on the target coding precision and the target coding mode comprises:

extracting, from the target key information of the target data packet, to-be-coded data within a range of the target coding precision based on the target coding precision; and coding the to-be-coded data using the target coding mode, to generate the target verification information.

20. The medium according to claim 17, wherein the operations further comprise:

determining the target coding precision and the target coding mode of the received target data packet;

coding the received target data packet based on the target coding precision and the target coding mode, to determine to-be-verified information of the received target data packet; and verifying the received target data packet based on the target verification information and the to-be-verified information.

* * * * *